(12) United States Patent
Uhl et al.

(10) Patent No.: US 7,627,957 B2
(45) Date of Patent: Dec. 8, 2009

(54) COORDINATE MEASURING MACHINE AND METHOD FOR OPERATING A COORDINATE MEASURING MACHINE

(75) Inventors: Peter Uhl, Unterschneidheim (DE); Thomas Maier, Aalen (DE); Günter Grupp, Böhmenkirch (DE)

(73) Assignee: Carl Zeiss Industrielle Messtechnik GmbH, Oberkochen (DE)

(*) Notice: Subject to any disclaimer, the term of this patent is extended or adjusted under 35 U.S.C. 154(b) by 0 days.

(21) Appl. No.: 12/173,046

(22) Filed: Jul. 15, 2008

(65) Prior Publication Data

US 2008/0295349 A1   Dec. 4, 2008

Related U.S. Application Data

(63) Continuation of application No. PCT/EP2007/000584, filed on Jan. 17, 2007.

(30) Foreign Application Priority Data

Jan. 19, 2006   (DE) ..................... 10 2006 003 362

(51) Int. Cl.
G01B 5/008   (2006.01)
G01B 21/04   (2006.01)
G05B 19/19   (2006.01)

(52) U.S. Cl. ........................................ 33/503
(58) Field of Classification Search ............... 33/503
See application file for complete search history.

(56) References Cited

U.S. PATENT DOCUMENTS 4,456,960 A     6/1984   Wakai
4,631,834 A *   12/1986  Hayashi et al. ............... 33/503
5,189,806 A     3/1993   McMurtry et al.

(Continued)

FOREIGN PATENT DOCUMENTS

DE   3111425 A1   2/1982

(Continued)

OTHER PUBLICATIONS

International Preliminary Report on Patentability.

(Continued)

*Primary Examiner*—Christopher W Fulton
(74) *Attorney, Agent, or Firm*—Laurence A. Greenberg; Werner H. Stemer; Ralph E. Locher (57) ABSTRACT

In a method for operating a coordinate measuring machine and to a coordinate measuring machine, a coordinate measuring device, of the coordinate measuring machine is moved in at least one direction while being driven by an electric motor. An electrical drive current which flows through the electric motor for moving the electric motor and, move the coordinate measuring device is measured. A limit value for the electrical drive current is determined on the basis of a desired speed and/or on the basis of a desired acceleration with which the electric motor or the coordinate measuring device is intended to move. If the electrical drive current reaches the limit value determined and/or if the electrical drive current exceeds the limit value determined, the coordinate measuring device is changed to a predefined state, by virtue of the computer or the microcontroller switching off one of the switches disposed in the current path.

15 Claims, 5 Drawing Sheets

U.S. PATENT DOCUMENTS

| | | | |
|---|---|---|---|
| 5,778,551 A | | 7/1998 | Herklotz et al. |
| 6,124,588 A | | 9/2000 | Hagl et al. |
| 6,158,136 A | * | 12/2000 | Gotz et al. .................... 33/503 |
| 6,438,857 B2 | | 8/2002 | Jacobs et al. |
| 6,591,217 B1 | | 7/2003 | Baur et al. |
| 7,395,606 B2 | * | 7/2008 | Crampton .................... 33/503 |
| 2001/0013177 A1 | | 8/2001 | Jacobs et al. |
| 2004/0184039 A1 | * | 9/2004 | Christoph .................... 356/601 |
| 2007/0220767 A1 | * | 9/2007 | Pettersson .................... 33/503 |
| 2008/0249737 A1 | * | 10/2008 | Jordil et al. ................. 702/152 |
| 2008/0271332 A1 | * | 11/2008 | Jordil et al. .................... 33/503 |

FOREIGN PATENT DOCUMENTS

| | | | |
|---|---|---|---|
| DE | 3743076 A1 | | 6/1989 |
| DE | 4038779 A1 | | 6/1992 |
| DE | 19508861 A1 | | 9/1996 |
| DE | 19727352 A1 | | 1/1998 |
| DE | 19937737 A1 | | 3/2001 |
| DE | 19958306 A1 | * | 6/2001 |
| DE | 10024976 A1 | | 7/2001 |

OTHER PUBLICATIONS

International Search Report.

* cited by examiner

COORDINATE MEASURING MACHINE AND METHOD FOR OPERATING A COORDINATE MEASURING MACHINE

CROSS-REFERENCE TO RELATED APPLICATIONS

This is a continuation, under 35 U.S.C. §120, of copending international application No. PCT/EP2007/000584, filed Jan. 17, 2007, which designated the United States; this application also claims the priority, under 35 U.S.C. §119, of German patent application No. DE 10 2006 003 362.0, filed Jan. 19, 2006; the prior applications are herewith incorporated by reference in their entirety.

BACKGROUND OF THE INVENTION

Field of the Invention

The invention relates to a coordinate measuring machine and to a method for operating the coordinate measuring machine. The coordinate measuring machine has a coordinate measuring device, in particular a measuring head. The coordinate measuring device is driven by at least one electric motor such that it can be moved and, for example, can be moved in at least one direction.

Coordinate measuring machines such as these are generally known, for example from U.S. patent publication No. 2001/013177 A1. However, the invention is not restricted to a specific type of coordinate measuring device (for example probe-type measuring head of the switching or non-switching type).

When measuring the coordinates of measurement objects using movable coordinate measuring devices, special precautions must be taken. On the one hand, the measurement object should itself be protected against mechanical damage which could occur if the coordinate measuring device were to strike the measurement object. On the other hand, people and parts of the measuring arrangement itself must also be protected against such mechanical damage. From this protection point of view, it could be deduced that there is the requirement for the electric motor or motors of the coordinate measuring machine to be operated only with small electric currents.

Furthermore, the maximum speed which the coordinate measuring device, which is driven by the electric motor, may reach could be limited to low values. However, this is contrary to the requirement to carry out the measurement in as short a time as possible. This in turn requires high accelerations and, depending on the characteristics of the respective test layout, in some circumstances also high speeds of the coordinate measuring device.

Published, non-prosecuted German patent application DE 100 24 976 A1 discloses a torque regulation device which compares an actual motor current with a set motor current, and produces a manipulated variable signal in dependence on the comparison result. Care is taken by comparison with a maximum permissible motor current to ensure that the motor current is below the maximum permissible value, in order in this way to avoid a test element striking hard against a body.

However, a procedure such as this has the disadvantage that the motor current is limited by the maximum value even when the test element is not in the vicinity of the measurement object. The speed at which the test element can be moved and the acceleration are therefore limited.

SUMMARY OF THE INVENTION

It is accordingly an object of the invention to provide a coordinate measuring machine and a method for operating the coordinate measuring machine, that overcomes the above-mentioned disadvantages of the prior art methods and devices of this general type, which allow uninterrupted protection of people and equipment while a measurement object is being measured. In this case, it should be possible to move the coordinate measuring device at any desired speeds and accelerations.

According to one major idea of the present invention, a limit value is determined for the electrical drive current of the electric motor depending on a set speed and/or depending on a set acceleration at which the movement of the electric motor or the movement of the coordinate measuring device is intended to take place.

This fundamental idea also covers refinements in which the set speed and/or the set acceleration are/is not used to determine the limit value, but equivalent variables such as the set rotation speed of the electric motor or of a shaft driven thereby, or the set torque of the electric motor or of the shaft.

The set rotation speed and the set torque (or the set angular acceleration) are equivalent to the set speed and the set acceleration, assuming disturbance-free operation and that the transmission ratio of the drive does not change. Disturbance-free refers to that there is no unexpected obstruction on the movement path traveled by the coordinate measuring device. In other words, the measurement of the measurement object can be planned by planning the movement of the coordinate measuring device. By way of example, all of the components of the set speed and of the set acceleration can for the purposes of this plan in each can be calculated using a Cartesian coordinate system (preferably the coordinate system in which the coordinates of the measurement object are intended to be determined). In this case, there is no need to calculate the entire measurement process in advance, before the start of the measurement. In fact, the prior calculation or presetting of the set values can be carried out, for example, in each case for a time period during the measurement. If the present movement state is known or disturbance-free measurement operation has already taken place, the set rotation speed and/or the set torque can, however, also be taken into account for determination of the current limit value (in particular taking into account the physical mechanical model of the test layout, including the moving masses)—in an equivalent form to the set speed and/or the set acceleration.

The invention makes it possible for the operator of a coordinate measuring machine to allow higher speeds and/or accelerations during specific time periods of the movement of the coordinate measuring device than in other phases. For example, the coordinate measuring device can be brought from a waiting position, in which it is located well away from the measurement object, at high acceleration values to a high speed, until it reaches a predefined area in the vicinity of the measurement object. Furthermore, in particular for personnel protection reasons, it is possible to permit only a low speed or acceleration in specific danger areas even outside the close area.

Different current limit values are applicable in accordance with the movement phases or movement areas planned and/or defined in this way. In order to achieve high acceleration of the coordinate measuring device, a correspondingly high current limit value is required. If only a slow speed is preset and only low acceleration values are permitted, the current limit value may be chosen to be low.

In particular, a method is proposed for operating a coordinate measuring machine, wherein a coordinate measuring device, in particular a measuring head, of the coordinate measuring machine can be moved in at least one direction, driven by at least one electric motor, and wherein the method has the following steps:

(a) an electrical drive current which flows through the electric motor in order to move the electric motor and in this way to move the coordinate measuring device, is measured, (b) depending on a set speed and/or depending on a set acceleration at which the movement of the electric motor or the movement of the coordinate measuring device is intended to take place, a limit value is determined for the electrical drive current, and (c) if the electrical drive current reaches the determined limit value, and/or if the electrical drive current exceeds the determined limit value, the coordinate measuring device is brought to a predefined state.

"Exceeding" the limit value includes a situation in which, for example, the drive current is greater than the limit value in one case, or in another case, for example, in which it is less than the limit value. "Exceeding" should therefore be understood in the sense of "crossing over". The process of determining a limit value and monitoring whether the limit value has been reached and/or exceeded also includes the option of a limit value band, that is to say a range of values for the drive current which is defined by a lower limit value and an upper limit value. This is then monitored to determine whether the drive current has departed from the limit value band, that is to say the range, in which case the coordinate measuring device is brought to the predefined state.

The use of a coordinate system to determine the coordinates is not restricted to the coordinates being Cartesian coordinates. In fact, coordinates of any type may be determined, for example polar coordinates, cylindrical coordinates, etc.

The expression a coordinate measuring machine refers to not only a machine by which coordinates can be determined in a coordinate system but also a machine which makes it possible to check the position of a measurement object, for example as described in published, non-prosecuted German patent application DE 100 24 976 A1. In an even more general form, the so-called coordinate measuring device can be configured just to check the presence of a body. For example, the coordinate measuring device may have a mechanical sensor and/or an optical sensor.

One major advantage of the current monitoring according to the invention is that the monitoring can remain active even during accelerated movement of the coordinate measuring device. In principle, acceleration values of any desired magnitude may be permissible without having to switch off the current monitoring.

A fixed functional relationship is preferably predetermined between the set speed and/or the set acceleration on the one hand and the current limit value on the other hand, at least for one specific operating phase. In this case, the functional relationship may also depend on further parameters which are clearly defined, for example, by one or more of the following factors: by the environmental temperature, by the temperature of parts of the coordinate measuring machine (for example the temperature of the bearings which bear parts that move during the movement of the coordinate measuring device), by the position of the coordinate measuring device in a fixed-position coordinate system, by the relative position of the coordinate measuring device with respect to the measurement object or with respect to other parts of the test layout, and/or by operating states (for example a currently selected transmission gear in a multigear transmission which is used to transmit the power from the electric motor to the coordinate measuring device to be moved). The consideration of parameters such as these further improves the safety. This allows the current limit value to be placed closer to the current value which is actually required for operation. By way of example, the friction in the various transmission gears that can be selected is of different magnitude. The greater the friction is, the higher the current limit value must be chosen to be. Furthermore, for example, the functional relationship can take account of parameters for one or more of the following operating states:

(a) a part of the coordinate measuring device, for example a measuring head, reaches a predefined area;

(b) a person or an object enters a predefined area; and/or (c) the absolute positions and/or relative positions of various parts of the coordinate measuring device satisfy a predefined criterion.

Protective devices such as light barriers and/or step mats detect access or entry (points a and b). The coordinates of different coordinate axes are evaluated, for example, in order to determine whether the predefined criterion has been satisfied.

In particular, a limit value is therefore in each case applicable only instantaneously for the current operating time and/or for a short time period, for example until a computation device has calculated a new limit value for the motor current or, for example, has determined this by reading it from a data memory, on the basis of changes in the values of the set speed and/or the set acceleration.

If the predetermined and/or instantaneous limit value has been exceeded or if the limit value has been reached or exceeded, measures can automatically be taken in order to bring about the predefined state. The predefined state was defined before the limit value was exceeded or reached.

One possibility for the measures is to emit one or more warning signals (audibly and/or visually). However, the electrical drive current is preferably switched off and/or the coordinate measuring device is decoupled from its drive device such that it can no longer transmit forces to other objects. Therefore the coordinate measuring device and preferably the entire coordinate measuring machine or system is brought to a so-called safe state. The measures to be taken also include, as one possible embodiment, limiting the force and/or the torque of the electric motor to a predetermined value. This value may be invariable or may depend on the operating state, the position of the coordinate measuring device and/or further factors.

The electrical drive current is preferably switched off if the electrical drive current reaches and/or exceeds the determined limit value continuously over a time interval of predetermined length. Alternatively or additionally, it is possible to use a value which has been determined after smoothing of time fluctuations in the measured value determined as the electrical drive current to determine whether the limit value has been reached and/or exceeded. In both cases, this makes it possible to ensure that there will be no effects on the operation of the coordinate measuring machine in response to very briefly exceeding (in particular caused by a measurement error) or very briefly reaching the limit value.

The coordinate measuring device is brought to rest particularly quickly if, as in one preferred embodiment, the current direction of the electrical drive current is first of all reversed, before the electrical drive current is switched off. This measure makes it possible to use the time which is generally required for switches (for example relays) to switch off. Before the magnetic field in the switch has decayed, the current could have already been reversed and in this way the movement of the coordinate measuring device slowed down or stopped.

A plurality of electric motors are preferably provided in the coordinate measuring machine and together produce the movement of the coordinate measuring device. In this case, the movements of the electric motors are clearly associated with movement components of the movement of the coordinate measuring device. For example, at least one electric motor is in each case provided for a linear movement of the coordinate measuring device, in which case each of the linear movements can take place exclusively in one of three directions which are perpendicular to one another in pairs. It is therefore possible to move to any desired point in a direct path within a movement area that can be accessed. In general, when there are a plurality of electric motors which jointly produce the movement of the coordinate measuring device, a limit value of the electrical drive current is preferably determined separately for each of the plurality of electric motors, with this limit value being dependent on a set speed and/or being dependent on a set acceleration of the movement component which is produced by the respective electric motor.

In the case of a coordinate measuring machine in each case having at least one electric motor for the X-axis, the Y-axis and the Z-axis in a Cartesian coordinate system, therefore limit values are determined separately for the motor currents as a function of the set speeds and/or as a function of the set acceleration values in the X-direction, the Y-direction and the Z-direction.

In particular, a plurality of electric motors can be provided for at least one of the movement components, as is the case for example in coordinate measuring machines with a portal configuration. In this case, the limit value is preferably determined for each of the electric motors for the same movement component (in the case of physically identical electric motors, the same limit value can be used in some cases), and is monitored separately to determine whether the limit value for the electric motor under consideration has been reached and/or exceeded.

In one preferred refinement, at least one measured value of the electrical drive current during operation of the coordinate measuring machine, in particular during movement of the coordinate measuring device, is compared with an expected value in order to check the measurement of the electrical drive current for measurement errors. For example, the expected value can be determined using the set speed and the set acceleration. Subject to the precondition that the coordinate measuring device is moving without any impediment, this makes it possible to check the measurement of the electrical drive current for correct operation. In the case of machines with more than one motor for one movement direction (for example a double drive on a gantry machine with a portal or bridge configuration), it is advantageous to limit the total of the motor currents of the two motors of the double drive rather than the individual motor currents.

A further possible way to identify a faulty sensor for measurement of the motor current or incorrect processing of the signals produced by a sensor such as this is to check the measured values for plausibility. There is no fixed comparison value available for the plausibility check. In fact, changes in the current measured value over time can be evaluated in suitable operating phases. For example, after a phase of acceleration of the coordinate measuring device, which is followed by a phase of constant speed of the coordinate measuring device, the current must fall back to a considerably lower value. Comparison values for the plausibility check may, in particular, be the set speed, the set acceleration and/or the actual speed or acceleration, which are obtained by evaluation of a tacho-signal and/or by use of the information which is used by the coordinate measuring machine to actually determine coordinates of a measurement object.

Alternatively or additionally, it is possible to carry out a calibration mode of the coordinate measuring machine, during which the coordinate measuring device is moved freely without being impeded by objects. The calibration mode is not used to check the current measurement, but the determination of current values of the electric-motor current. In particular, normal values of the electrical drive current may be measured and stored for various values of the speed and/or of the acceleration of the coordinate measuring device, and wherein limit values of the electrical drive current are defined for various values of the set speed and/or of the set acceleration from the normal values, before operation of the coordinate measuring machine. The expression "normal" values refers to values which have been obtained in normal operating conditions, without any impediment to the movement of the coordinate measuring device. If the aim is to determine the current limit value as a function of at least one further parameter, the parameter or these parameters is or are preferably determined and varied during the calibration mode. For example, this makes it possible for a computer for the coordinate measuring machine to learn the magnitude of the current as a function of the speed and/or as a function of the acceleration. A corresponding, somewhat higher current limit value can then be defined for each speed value and/or acceleration value and, for example, can be stored on a hard disk or some other non-volatile data memory.

The stored data is preferably protected against inadvertent changes by use of a monitoring variable such as CRC (cyclic redundancy code) checksum.

For example, the current limit value in one simple case can be defined by increasing the current value determined for the respective operating state by a fixed predetermined amount. However, the fixed predetermined amount is optionally also dependent on the speed (and also optionally on other parameters such as the temperature).

In order to allow the current values determined during the calibration mode to be associated with the speed and the acceleration of the coordinate measuring device, the speed and the acceleration of the coordinate measuring device are in one refinement of the invention determined during the calibration mode using an evaluation device, which is provided for actual operation of the coordinate measuring machine, in order to determine coordinates and/or using a tacho-signal from the electric motor. A tacho-signal refers to a signal from a signal transmitter which is combined with the electric motor. For example, the signal transmitter produces an electrical signal whenever a rotor in the electric motor has rotated onwards through a specific fixed predetermined angle. Tacho-signals are used, for example, to control operation of the electric motor. They are used as a feedback signal for a control device (output stage), which adjusts the motor current.

The current limit value, which depends on the set speed and/or the set acceleration of the coordinate measuring device, is preferably determined by at least one computation device. Alternatively or additionally, the computation device can also initiate and/or control measures which must be taken when the current limit value is reached and/or overshot. This functionality of the computation device can be provided by hardware and/or software.

As will be described in more detail with reference to the figures, a plurality of computation devices may be used in order to increase the protection against failure of the current monitoring.

The scope of the present invention also includes a coordinate measuring machine having a coordinate measuring device, in particular a measuring head, which can be moved in at least one direction, driven by at least one electric motor. The coordinate measuring machine has the following:

(a) a current measuring device which is configured to measure an electrical drive current which flows through the electric motor in order to move the electric motor and in this way to move the coordinate measuring device, (b) a set-value determination device which is configured to determine a limit value for the electrical drive current depending on a set speed and/or depending on a set acceleration at which the movement of the electric motor or the movement of the coordinate measuring device is intended to take place, and (c) an operating device, which is connected to the current measuring device and to the set-value determination device and which is configured to bring the coordinate measuring device to a predefined state (for example a so-called safe state) if the electrical drive current reaches the determined limit value, and/or if the electrical drive current exceeds the determined limit value, (or if the drive current departs from the limit value band).

By way of example, the operating device has a switch-off device, which is connected to the current measuring device and to the set-value determination device and which is configured to switch off the electrical drive current if the electrical drive current reaches the determined limit value, and/or if the electrical drive current exceeds the determined limit value.

In particular, the coordinate measuring machine may have a computer or a computation device which contains the set-value determination device. Furthermore, the scope of the invention includes a computer program which, when run on a computer or computer network, determines at least the current limit value and optionally also initiates and/or controls the respective measures to be taken on reaching and/or exceeding the current limit value. In particular, the computer program has a program code measure which can be stored on a computer-legible data storage medium.

The monitoring of the drive current according to the invention can optionally be switched off.

Furthermore, the scope of the invention includes a data storage medium on which a data structure is stored which, after being loaded into a main memory and/or a user memory of a computer or a computer network, determines at least the current limit value and optionally also initiates and/or controls the respective measures to be taken on reaching and/or exceeding the current limit value.

Other features which are considered as characteristic for the invention are set forth in the appended claims.

Although the invention is illustrated and described herein as embodied in a coordinate measuring machine and a method for operating the coordinate measuring machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
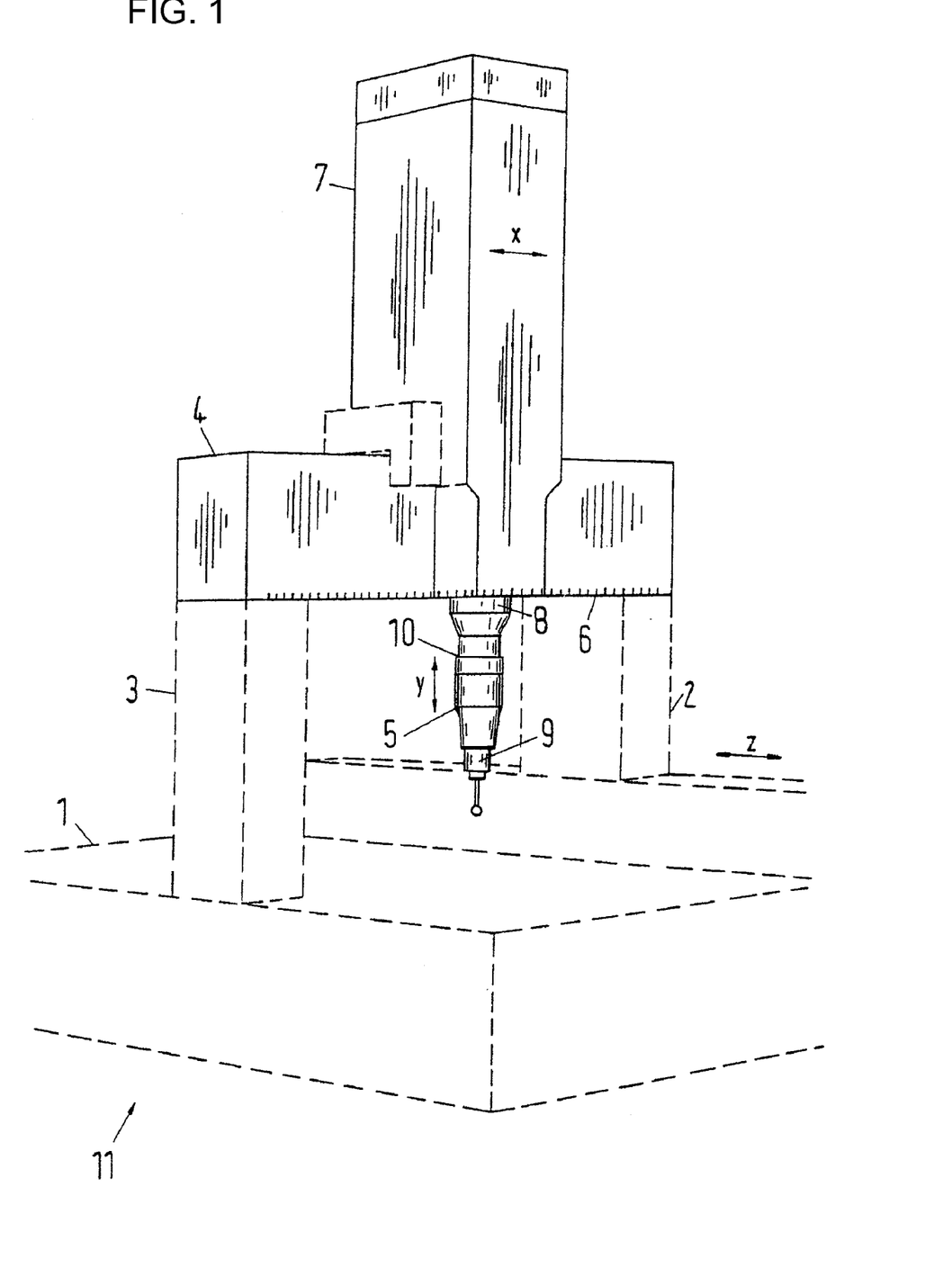
FIG. 1 is a diagrammatic, perspective view of a coordinate measuring machine with a portal configuration according to the invention.

Referring now to the figures of the drawing in detail and first, particularly, to FIG. 1 thereof, there is shown a coordinate measuring machine (CMM) 11 having a portal configuration with a measurement table 1 above which columns 2, 3 are arranged such that they can move in a Z-direction of a Cartesian coordinate system. Together with a lateral mount 4, the columns 2, 3 form a portal for the CMM 11. The lateral mount 4 is connected to the columns 2 and 3 at its opposite ends. Electric motors, which are not illustrated in any more detail, cause the columns 2, 3 to be moved linearly in the Z-direction. In this case, each of the two columns 2, 3 has an associated electric motor.

The lateral mount 4 is combined with a lateral carriage 7 which can move, on air bearings, along the lateral mount 4 in the X-direction of the Cartesian coordinate system. The instantaneous position of the lateral carriage 7 relative to the lateral mount 4 can be determined on the basis of a scale subdivision 6. The movement of the lateral mount 4 in the X-direction is driven by a further electric motor.

A spindle 8 is mounted on the lateral carriage 7, can move in a vertical direction and is connected at its lower end via a mounting device 10 to a coordinate measuring device 5. A probehead 9 is arranged removably on the coordinate measuring device 5. The coordinate measuring device 5 can be driven by a further electric motor relative to the lateral carriage 7 in the Y-direction of the Cartesian coordinate system. A total of four electric motors therefore allow the probehead 9 to be moved to any point underneath the lateral mount 4 and above the measurement table 1 located in the intermediate space defined by the columns 2, 3.

Figure 2:
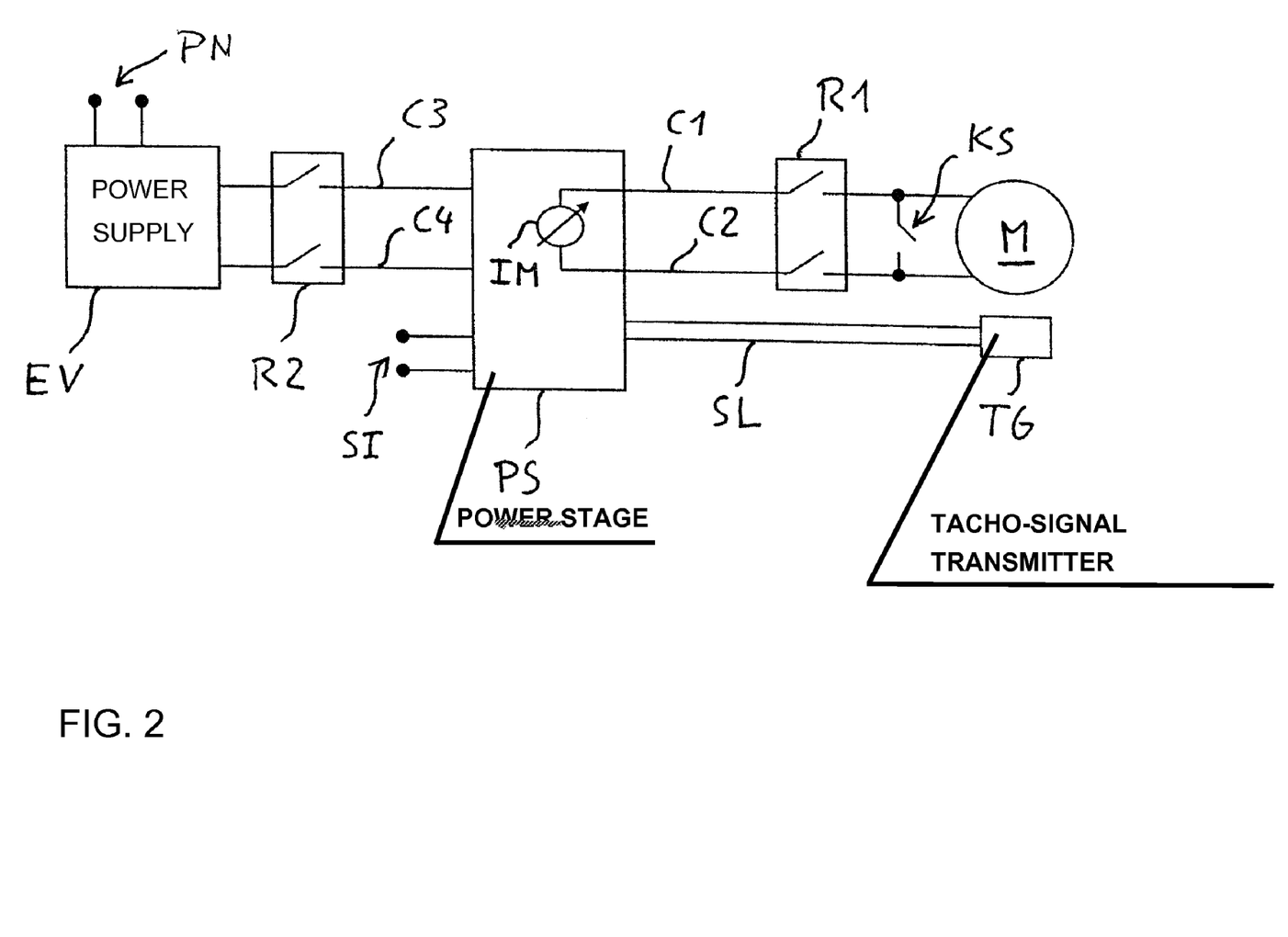
FIG. 2 is a schematic illustration showing a configuration with a power stage (output stage) which supplies a motor current to an electric motor.

The arrangement illustrated in FIG. 2 shows a number of details illustrating how one of the electric motors M of a coordinate measuring machine, for example the coordinate measuring machine described with reference to FIG. 1, is supplied with electrical power and is controlled during operation. The motor M in the exemplary embodiment is connected to a power stage PS via two electrical connections C1, C2. The power stage PS has a signal input SI, via which, for example, it receives a control signal from a computer or from a microcontroller. The power stage PS adjusts a motor current flowing via the lines C1, C2 in accordance with the control signal.

In particular, the set position and the actual position and/or the set speed of the coordinate measuring device can be used as input variables for the overall control device. The overall control device may have further regulators in addition to the output stage, for example current regulators, rotation speed regulators and position regulators.

The power stage PS can be supplied with electrical power, which is required to feed the motor current, via a mains connection PN which can be connected to an electrical AC voltage power supply system, via a power supply unit EV which, for example, has a transformer and a rectifier, via a two-pole relay R2 and via two electrical connections which connect the power supply unit EV to the power stage PS via the relay R2.

The power stage PS has a current measuring device IM, or is combined with such a current measuring device, by which the motor current flowing through the electrical connections C1, C2 and through the motor M can be measured. Furthermore, the power stage PS has an actuating element, which is not illustrated in any more detail in FIG. 2, for adjusting the motor current.

Furthermore, a tacho-signal transmitter TG is provided, produces tacho-signals as a function of the movement of the electric motor, and transmits them via a signal line SL to the power stage PS. By way of example, the tacho-signal transmitter TG is a rotary transformer which generates a voltage corresponding to the rotation speed.

During operation of the coordinate measuring machine, the power stage PS therefore adjusts the motor current in the electrical connections C1, C2 (direct current), and regulates it, in accordance with the control signal applied to the control signal input SI (for example an analog DC voltage value in the range −10V to +10V), with the power stage PS continuously or virtually continuously evaluating the tacho-signal produced by the tacho-signal transmitter.

If the coordinate measuring machine has a plurality of motors, each is preferably an example of the arrangement, as illustrated in FIG. 2, for each of the electric motors. However, in this case, the power supply unit EV may be used, for example, jointly by all the arrangements.

Figure 3:
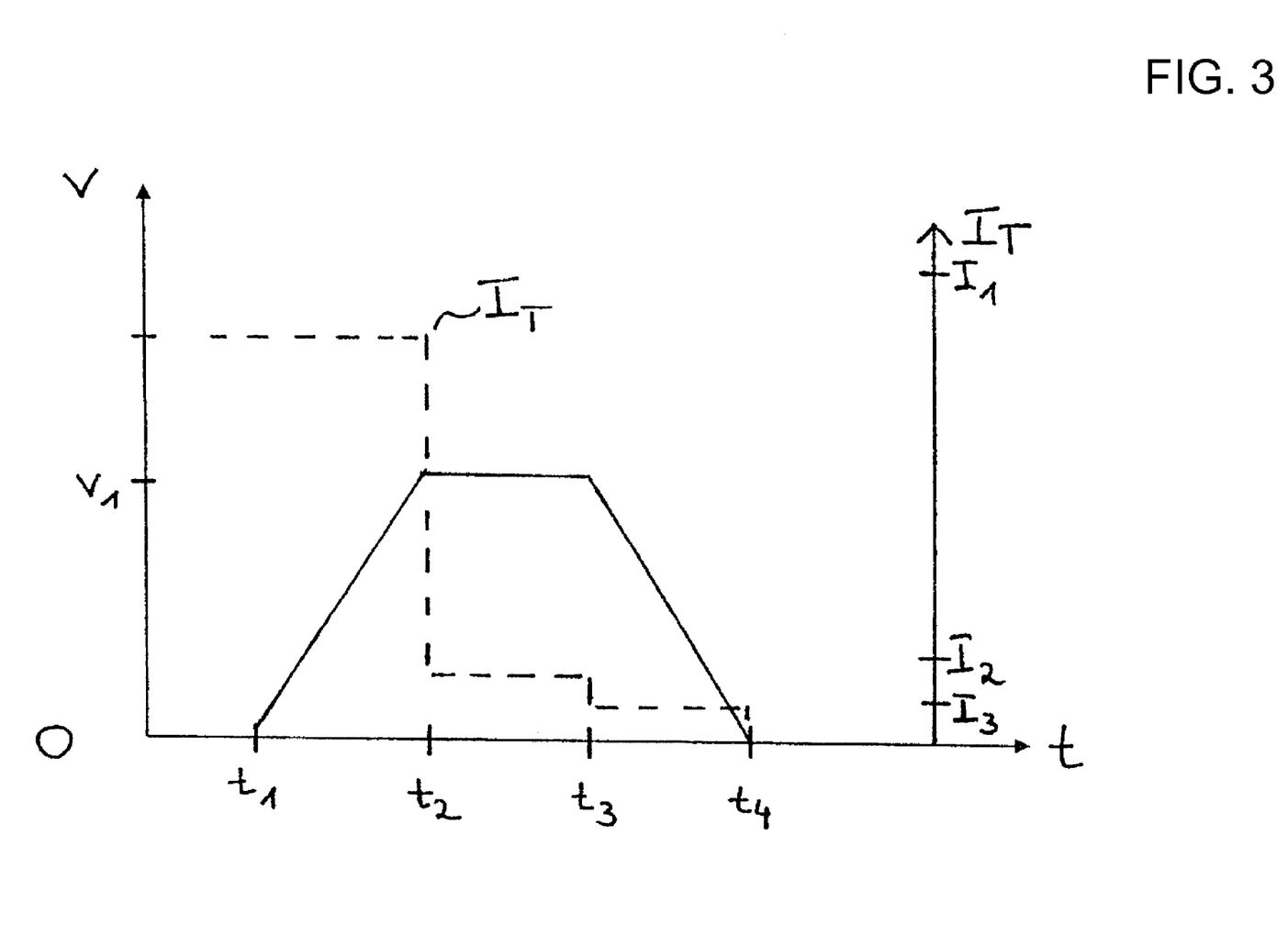
FIG. 3 is a graph showing a speed and a current limit value as a function of time for one simple example of operation of the coordinate measuring machine.

FIG. 3 shows a trapezoidal time profile of the speed of the coordinate measuring device. In the exemplary embodiment described here, the speed is, for example, the component of the speed vector in the X-direction in the coordinate system illustrated in FIG. 1.

A speed v starts to rise linearly at the time t1. The linear rise lasts until the time t2 is reached. The acceleration in the X-direction is constant, corresponding to the linear rise of the speed v. In order to achieve the acceleration, the associated electric motor must be supplied with a relatively high, approximately constant, current. A current limit value IT (dashed line shown in the graph in FIG. 3) is accordingly constant at a high value I1 in the time interval [t1; t2]. Appropriate measures are taken only if the high limit value I1 is exceed or if the limit value IT is reached.

At the end of the acceleration phase, at the time t2, the speed v has reached the value v1. As the movement continues (or the movement component in the X-direction), the speed v remains at the value v1 until the time t3 is reached. Only a very much lower motor current is accordingly required than that previously in the acceleration phase. Essentially, the motor current need be applied only because the movement of the motor and of the moving parts which are driven by the motor is subject to friction. However, the current limit value IT may be very much lower than that in the acceleration phase. The value I2 shown in the central time period in the illustration is sufficient for use as the current limit value IT.

A phase of negative acceleration (deceleration) starts at the time t3, at a constant value until the coordinate measuring device becomes stationary with respect to the X-direction at the time t4. An even lower current limit value I3 is sufficient for this purpose.

Depending on the friction which must be overcome during the deceleration phase, it is even possible for a negative motor current to flow, that is to say the motor can be actively braked by current reversal. Nevertheless, a positive current limit value I3 is preferably chosen for the deceleration phase. Specifically, if it is undesirable during the deceleration phase to strike one of the parts which are driven by the electric motor, the power stage (for example the power stage illustrated in the arrangement shown in FIG. 2) would attempt to increase the motor current.

If the motor current is increased, the current limit value I3 is then quickly reached, which in turn leads to appropriate measures being taken.

On reaching or on exceeding the current limit value which is in each case applicable at any given time a control signal is preferably emitted as quickly as possible to the power stage PS, causing the power stage PS to reverse the motor current unless a motor current is already flowing in the opposite direction (that is to say a motor current which is actively braking the motor). Furthermore, both the relay R1 and the relay R2 are operated, in order to open both the relays R1, R2, via control lines which are not illustrated in FIG. 2. Once the two relays have been opened, both the electrical power supply to the power stage PS (via the electrical connections C3, C4) and the motor power supply line (electrical connections C1, C2) are interrupted. Furthermore, a short is preferably produced between the two motor electrical power connections, to which the electrical connections C1, C2 are connected, via a short-circuiting switch KS (see FIG. 2) which is disposed between the relay R1 and the motor M. In this case, care must be taken to ensure that the short is created only once the relay R1 has already been opened.

The relationship between the current limit value IT and the acceleration has been explained with reference to FIG. 3. It should also be mentioned that the trapezoidal speed curve is a set-value curve. Therefore the current limit value is defined as a function of the set acceleration. In addition, the current limit value may depend on the set speed. If movement were to be carried out at a higher set speed v in the time interval [t2; t3], for example, then a higher current limit value would have to be chosen than the limit value I2 illustrated in FIG. 3 since, in particular, increased friction must be expected. A changing current limit value IT can also be preset as a modification to the stepped profile of the current limit value IT, in each case with horizontal, constant current limit values I1, I2, I3, during the phases with constant acceleration and constant deceleration, as well. In particular, the current limit value for relatively high speed values can also be chosen to be higher during these phases than for lower speed values.

Figure 4:
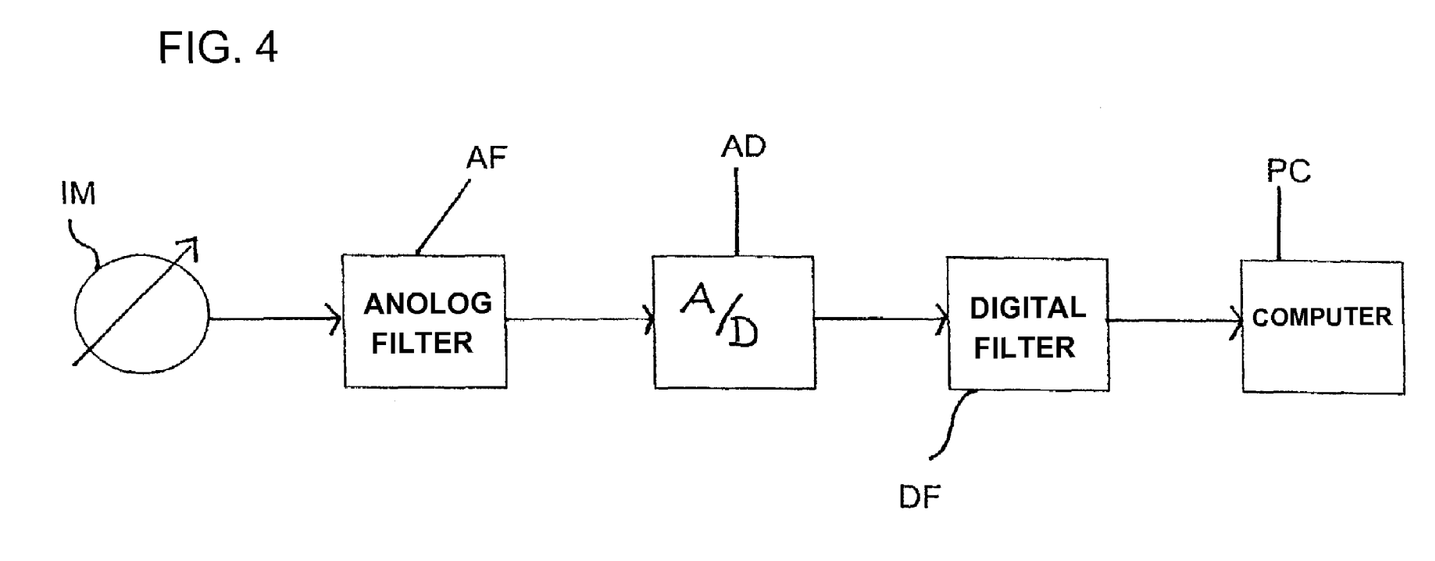
FIG. 4 is a schematic illustration showing a measurement chain for processing of a measured value of the motor current.

By way of example, the arrangement illustrated in FIG. 4 is used to process the current measured values from the motor current sensor IM in the power stage PS. The current sensor IM produces an analog measurement signal, which is optionally supplied by an analog filter AF, in order to smooth the measurement signal over time, to an analog/digital converter AD. The converter AD converts the analog signal to a digital signal and passes it via a further optional digital filter DF, for smoothing the measurement signal over time, to a computer PC. By way of example, the computer PC may be a computation device in which the instantaneous current limit value is also determined in a dependence on the set speed and in dependence on the set acceleration. Furthermore, the computer PC may optionally also produce the control signal which is supplied via the signal input SI to the power stage PS.

Figure 5:
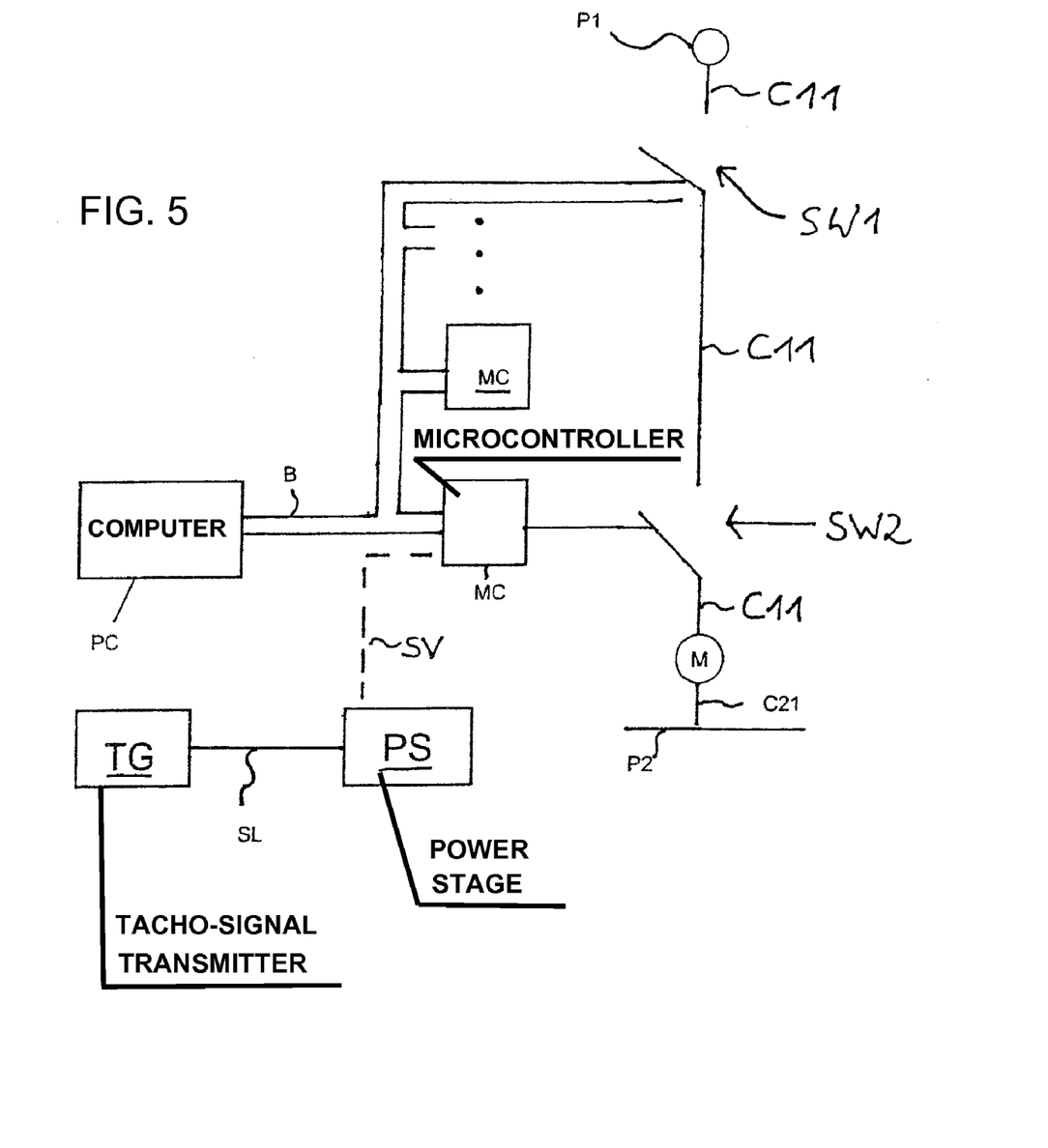
FIG. 5 is a schematic illustration showing a configuration with a computer and at least one microcontroller for monitoring the motor current.

FIG. 5 shows an arrangement whose various possible modes of operation will be described later. The arrangement has a computer PC, which has a data bus B or is connected to a data bus such as this. Furthermore, a plurality of microcontrollers MC are connected to the data bus. FIG. 5 shows two of the microcontrollers MC. As is indicated by three dots, even more microcontrollers may, however, be provided, preferably with one microcontroller in each case for each electric motor to be monitored in the coordinate measuring machine.

By way of example, the lower of the two illustrated microcontrollers MC is used to monitor the motor current through one specific electric motor M, with this electric motor M likewise being illustrated in FIG. 5. The microcontroller MC is connected via a signal connection SV to a power stage PS, for example to the power stage PS illustrated in FIG. 2. Furthermore, a tacho-signal transmitter TG is once again provided, is connected via a signal line SL to the power stage PS, and produces a tacho-signal corresponding to the movement of the electric motor M.

FIG. 5 also shows an electrical line C11, which leads from a connection P1 at a first electrical potential, via at least one first switch SW1 and at least one second switch SW2, to the motor M, and supplies this with motor current during motor operation. A corresponding further electrical line C21 connects the motor M to a second electrical potential (P2). During normal operation of the electric motor M, the power stage PS controls the motor current through the lines C11, C21.

As can likewise be seen from FIG. 5, the computer PC (which, for example, may be a commercially available personal computer) is connected to the first switch SW1 via the data bus B. Further elements may be provided in order to operate the switch and convert a corresponding control signal (which is transmitted via the data bus B) from the computer PC in order to operate the switch SW1. Therefore the computer PC is always able to switch the switch SW1 on and off. If the computer PC now finds while monitoring the motor current (in a manner which will be described in more detail later) that the motor current must be interrupted, the computer PC switches off the switch SW1.

Furthermore, the microcontroller MC is connected via the signal connection SV to the power stage PS and is able to switch the second switch SW2 on and off.

In situations which will be explained in more detail later, the microcontroller switches the switch SW2 off in order to interrupt the motor current through the motor M.

In a more general form, and detached from the specific exemplary embodiment shown in FIG. 5, at least two different control devices are preferably provided, and can interrupt the motor current independently of one another. This achieves additional safety for operation of the electric motor.

The embodiments described in the following text relate to the arrangement shown in FIG. 5. Both the computer PC and the microcontroller MC are able, as has already been described with reference to FIG. 5, to take "emergency-off measures" on reaching and/or exceeding the current limit value. For this purpose, the two devices cannot only interrupt the motor current individually and independently of one another, but can also in addition take the measures described with reference to FIG. 2, specifically by interrupting the so-called intermediate circuit (electrical connections C3, C4 in FIG. 2) and by shorting the motor.

The computer PC and the microcontroller MC monitor one another to determine whether functions which are related to the monitoring of the motor current are carried out within predetermined time intervals. For this purpose, the two devices interchange time stamps. The expression time stamps refers to signals which are sent to the respective other device after one of the functions to be monitored has been carried out, and contain information about a time in the function that has been carried out, in particular about the time at which execution of the function was completed. If one of these functions is carried out too late, the respective other device identifies that either no appropriate time stamp has been received at a time at which the function should have been carried out, or a time stamp which corresponds to the function being carried out at a late time has been received. In both cases, the device initiates the "emergency-off measures".

It is optionally possible to provide for the current monitoring to be switched off during operation of the coordinate measuring machine, for example during a specific operating phase (for example an acceleration phase), as a function of a predetermined position of the coordinate measuring device and/or as a function of an operating state of a device involved in the current monitoring. One requirement to switch off is that the computer transmits a predetermined signal (for example a specific value of a signal variable) repeatedly over a time period of predetermined length to the microcontroller. For confirmation, the microcontroller sends the signal back to the computer again, at least at the end of the predetermined time period. The current monitoring on the computer is deactivated only when the computer receives this signal. The same procedure can optionally also be carried out in the respective opposite signal direction (the microcontroller repeatedly sends the predetermined signal over the time period etc.), in order to switch off the current monitoring on the microcontroller. This procedure is necessary when the current monitoring (that is to say at least the determination of the instantaneous current limit value and the check as to whether the instantaneous motor current has reached and/or exceeded the limit value) is also carried out in the microcontroller, as is the case in one preferred embodiment. In this case the following values and signals are preferably available to the computer for each of the electric motors to be monitored, and the microcontroller associated with the respective electric motor (a single microcontroller is also possible for a number of the motors or all the motors):

i) the tacho-signal for determination of the instantaneous speed, ii) the instantaneous value of the speed of the coordinate measuring device, which has been determined by the coordinate measuring machine itself, iii) the instantaneous measured current value of the motor current, and iv) the set speed value of the movement component which is associated with the respective electric motor.

The current limit value to be expected from i) and/or ii) as well as from iv) is determined, and is compared with the measured value from iii) to check whether the measured value is plausible.

In the embodiment in which both the computer and the microcontroller carry out current monitoring separately, the information relating to the current values (which have been determined, for example, in a calibration mode) is available to both devices for operation without any impediment. The data available to the computer is, for example, stored on its hard disk. The data which is available to the microcontroller is, for example, stored in a flash memory of a card on which both the memory and the microcontroller are arranged. Computers and microcontrollers are therefore able to determine a current limit value separately and independently of one another. The data is preferably protected against being changed.

The invention claimed is:

1. A method for operating a coordinate measuring machine having a coordinate measuring device movable in at least one direction and driven by at least one electric motor, which comprises the steps of:
   a) measuring an electrical drive current flowing through the electric motor to move the electric motor and in this way to move the coordinate measuring device;
   b) determining one of a limit value and a limit value range defined by a lower limit value and an upper limit value for the electrical drive current in dependence on at least one of a set speed and a set acceleration at which one of a movement of the electric motor and a movement of the coordinate measuring device is intended to take place, and a functional relationship is fixedly predetermined between at least one of the set speed and the set acceleration on the one hand and a current limit value on the other hand; and
   c) bringing the coordinate measuring device to a predefined state if one of the electrical drive current reaches the limit value, the electrical drive current exceeds the limit value, and the limit value range is departed from.

2. The method according to claim 1, which further comprises switching off the electrical drive current if the electrical drive current at least one of reaches and exceeds the limit value continuously over a time interval of predetermined length.

3. The method according to claim 2, which further comprises reversing a current direction of the electrical drive current, before the electrical drive current is switched off.

4. The method according to claim 1, which further comprises using in step c) a value which has been obtained after smoothing of time fluctuations in the measured value determined in step a) as the electrical drive current.

5. The method according to claim 1, which further comprises determining a functional relationship between at least one of the set speed and the set acceleration on the one hand and the current limit value on the other hand, in addition by use of at least one parameter unambiguously determined by at least one of the factors listed selected from the group consisting of an environmental temperature, a temperature of parts of the coordinate measuring machine, a position of the coordinate measuring device in a fixed-position coordinate system, a relative position of the coordinate measuring device with respect to a measurement object or with respect to other parts of a test layout, and an operating state of the coordinate measuring machine.

6. The method according to claim 1, which further comprises:
   providing a plurality of electric motors to move the coordinate measuring device, movements of the electric motors can be clearly associated with movement components of the movement of the coordinate measuring device; and
   carrying out the steps a) to c) separately for each of the plurality of electric motors, and at least one of the set speed and the set acceleration in step b) is available for each of the movement components, and the limit value is in each case determined in dependence on this.

7. The method according to claim 1, which further comprises comparing at least one value measured in step a) of the electrical drive current during operation of the coordinate measuring machine to an expected value for checking the measurement of the electrical drive current for measurement errors.

8. The method according to claim 7, which further comprises determining the expected value using the set speed and the set acceleration.

9. The method according to claim 1, which further comprises measuring and storing normal values of the electrical drive current for at least one of various values of speed and acceleration of the coordinate measuring device during a calibration mode of the coordinate measuring machine, during which the coordinate measuring device is moved freely without being impeded by objects, and the limit values of the electrical drive current are defined for various values of the set speed and/or of the set acceleration from the normal values, before operation of the coordinate measuring machine.

10. The method according to claim 1, which further comprises determining a speed and an acceleration of the coordinate measuring device during a calibration mode using one of an evaluation device provided for actual operation of the coordinate measuring machine for determining coordinates and a tacho-signal from the electric motor.

11. The method according to claim 1, which further comprises providing a measuring head as the coordinate measuring device.

12. The method according to claim 1, which further comprises comparing at least one value measured in step a) of the electrical drive current during movement of the coordinate measuring device to an expected value for checking the measurement of the electrical drive current for measurement errors.

13. A coordinate measuring machine, comprising:
   at least one electric motor;
   a coordinate measuring device movable in at least one direction, and driven by said electric motor;
   a current measuring device for measuring an electrical drive current flowing through said electric motor for moving said electric motor and in this way to move said coordinate measuring device;
   a set-value determination device for determining one of a limit value and a limit value range for the electrical drive current depending on at least one of a set speed and a set acceleration at which one of a movement of said electric motor and a movement of said coordinate measuring device is intended to take place, a functional relationship being fixedly predetermined between at least one of the set speed and the set acceleration on the one hand and a current limit value on the other hand; and
   an operating device connected to said current measuring device and to said set-value determination device and configured for bringing said coordinate measuring device to a predefined state if one of the electrical drive current reaches the limit value determined by said set-value determination device, the electrical drive current exceeds the limit value determined by the set-value determination device, and the drive current departs from the limit value range.

14. The coordinate measuring machine according to claim 13, wherein said operating device has a switch-off device, connected to said current measuring device and to said set-value determination device, and configured to switch off the electrical drive current if one of the electrical drive current reaches the limit value, the electrical drive current exceeds the limit value, and the drive current departs from the limit value range.

15. The coordinate measuring machine according to claim 13, wherein said coordinate measuring device is a measuring head.

* * * * *